(12) United States Patent
Komurian et al.

(10) Patent No.: US 8,511,262 B2
(45) Date of Patent: Aug. 20, 2013

(54) VALVE DEVICE WITH A DRAWER AND CIRCUIT COMPRISING SUCH A VALVE

(75) Inventors: Richard Komurian, Turckheim (FR); Christian Adam, Colmar (FR)

(73) Assignee: Systemes Moteurs (Societe par Actions Simplifiee), Levallois-Perret (FR)

( * ) Notice: Subject to any disclaimer, the term of this patent is extended or adjusted under 35 U.S.C. 154(b) by 0 days.

(21) Appl. No.: 13/521,569

(22) PCT Filed: Jan. 17, 2011

(86) PCT No.: PCT/FR2011/050076
§ 371 (c)(1),
(2), (4) Date: Aug. 16, 2012

(87) PCT Pub. No.: WO2011/086335
PCT Pub. Date: Jul. 21, 2011

(65) Prior Publication Data
US 2012/0312256 A1    Dec. 13, 2012

(30) Foreign Application Priority Data

Jan. 13, 2010 (FR) ...................................... 10 50210

(51) Int. Cl.
*F01P 1/08* (2006.01)

(52) U.S. Cl.
USPC .......................................... 123/41.4; 251/283

(58) Field of Classification Search
USPC .......... 123/41.08, 41.01, 41.06, 41.09, 41.31, 123/41.4, 188.12, 188.13, 190.1, 190.2, 190.17; 251/163, 283, 286, 314, 311, 160, 167, 180, 251/188, 192, 206–209, 304, 309, 318, 326
See application file for complete search history.

(56) References Cited

U.S. PATENT DOCUMENTS 7,255,130 B2 *   8/2007   Martins et al. ........... 137/625.46
2008/0111092 A1   5/2008   Komurian et al.

FOREIGN PATENT DOCUMENTS

| EP | 1 903 265 A1 | 3/2008 |
|---|---|---|
| EP | 2 280 205 A2 | 2/2011 |
| FR | 2 906 334 A1 | 3/2008 |
| FR | 2 906 335 A1 | 3/2008 |
| GB | 1 155 115 A | 6/1969 |
| JP | 2008 255852 A | 10/2008 |

OTHER PUBLICATIONS

International Search Report, dated May 10, 2011, from corresponding PCT application.
French Search Report, dated Sep. 3, 2010, from corresponding French application.

* cited by examiner

*Primary Examiner* — Noah Kamen
*Assistant Examiner* — Hung Q Nguyen
(74) *Attorney, Agent, or Firm* — Young & Thompson (57) ABSTRACT

A slide-valve device sliding in a predetermined axial direction, includes a valve body having two chambers, the first chamber including a lateral fluid-intake opening and a fluid-outlet opening provided with a normally closed, conditionally opening plug device, the second chamber including first and second lateral fluid-outlet openings, mutually offset in the axial direction. Two inner regions of the second chamber are arranged contiguously in the axial direction and communicate with one another via an opening or an internal passage, and in that the sliding drawer includes a first plug member suitable for selectively plugging the communication opening or the internal communication passage or opening between the two regions and a second plugging member suitable for preventing fluid communication between the second lateral fluid-outlet opening of the second chamber and a first region of the second chamber, within a predetermined range of translation of the sliding drawer.

18 Claims, 8 Drawing Sheets

VALVE DEVICE WITH A DRAWER AND CIRCUIT COMPRISING SUCH A VALVE

FIELD OF THE INVENTION

This invention relates to the field of the controlled distribution and circulation of fluid, more particularly liquid, in a complex circuit, for example with several loops that are partially parallel and intertwined or interconnected, comprising common portions, such as the circuits for circulation of the cooling liquid of internal combustion engines of motor vehicles.

In the context referred to above, this invention has as its object a sliding-drawer slide valve device that regulates at least two exit pathways, and a cooling circuit that comprises such a valve device.

BACKGROUND OF THE INVENTION

Taking into account the requirements to reduce the costs of the available volumes and the total weight, which still prevail particularly in the field of automobile manufacture, there is a high demand for reducing the number of elements for regulating and monitoring the circulation of fluid in the complex circuits.

To the extent possible, an attempt is made in particular to integrate all of the regulating and monitoring functions into a single functional and structural unit, controlled by a single actuator, thus resulting in a single regulating node for several circuit parts of the same general circuit, for example a cooling circuit.

One additional possibility for cost reduction consists in implementing actuators that are low in cost and therefore have a simple and unsophisticated structure, for example rotary or linear actuators.

A dual problem then arises, namely the spatial connection of the different portions of the circuit at the node (bulkiness problem) and the implementation of different regulations for the different portions of the circuit while taking into account their hierarchy, their functions, and the production conditions, based on the general regulation at the level of the overall circuit.

The problems mentioned above occur in particular within the framework of the regulation, by means of a structural device or a single module, the circulation of the cooling liquid in a circuit that comprises a primary portion and three secondary portions, namely, for example, in addition to the circuit that passes through the engine block, also a loop that passes through a radiator, a loop that passes through a heater, as well as a bypass loop.

Valve units that essentially correspond to the different expectations that are expressed above are already known by the documents FR 2 906 334 and FR 2 906 335.

SUMMARY OF THE INVENTION

The purpose of this invention is to propose an improved valve device, having a simpler and sturdier structure and making it possible to obtain smaller leaks in the blocking position.

For this purpose, the invention has as its object a valve device with a drawer that slides in a given axial direction, whereby said valve device comprises a valve body with two chambers that communicate with one another and are contiguous in the axial direction, with the first chamber comprising a first lateral fluid-intake opening and a second fluid-outlet opening that is located essentially opposite the communication opening with the second chamber and is equipped with a blocking device that is normally closed and opens conditionally, the second chamber comprising first and second lateral fluid-outlet openings that are mutually offset in the axial direction and that emerge respectively into the first and second regions or inside volumetric zones that are separate from said second chamber and with the sliding drawer being guided in translation in said second chamber and movable under the action of a monitored-control actuator, valve device that is characterized in that the two inside regions of said second chamber are arranged in a contiguous manner in the axial direction and communicate with one another by means of an opening or an inside passage, and in that the sliding drawer comprises, on the one hand, a first blocking element that can selectively block, in two opposite end sliding positions of the drawer and by compression of a respective corresponding joint, the communication opening between the first and second chambers or the opening or the inside communication passage between the two regions of the second chamber, and, on the other hand, a second blocking element that can prevent fluid communication between the second lateral fluid-outlet opening of the second chamber and the first region of said second chamber, in a defined range of translational movement of the sliding drawer from its end position for blocking the communication opening between the two chambers.

BRIEF DESCRIPTION OF THE DRAWINGS

The invention will be better understood, thanks to the description below, which relates to preferred embodiments, provided by way of nonlimiting examples, and explained with reference to the accompanying diagrammatic drawings, in which:

FIGS. 1, 2, 3 and 5 show a sliding-drawer slide valve device 1 in a given axial direction X.

DETAILED DESCRIPTION OF THE INVENTION

This valve device 1 comprises a valve body 3 with two chambers 4, 4' that communicate with one another and are contiguous in the axial direction X, with the first chamber 4 comprising a first lateral fluid-intake opening 5 and a second fluid-outlet opening 5', located essentially opposite the communication opening 11 with the second chamber 5' and provided with a blocking device 7 that is normally closed and with a conditional opening. In addition, the second chamber 4' comprises first and second lateral fluid-outlet openings 8 and 8' that are mutually offset in the axial direction X and that emerge respectively into the first and second regions 9 and 9' or inside volumetric zones that are separate from said second chamber 4', and the sliding drawer 2 is guided in translation into said second chamber 4' and is movable under the action of a monitored-control actuator 10.

Consistent with the invention, the two inside regions 9 and 9' of said second chamber 4' are arranged contiguously in the axial direction X and communicate with one another by means of an opening or an inside passage 11, and the sliding drawer 2 comprises, on the one hand, a first blocking element 12 that can selectively block, in two opposite end sliding positions of the drawer 2 and by compression of a respective corresponding joint 14, 14', the communication opening 6 between the first and second chambers 4 and 4' or the opening or the inside communication passage 11 between the two regions 9 and 9' of the second chamber 4', and, on the other hand, a second blocking element 12' that can prevent fluid communication between the second lateral fluid-outlet opening 8' of the second chamber 4' and the first region 9 of said second chamber 4', this in a defined range for translational movement of the sliding drawer 2 from its end position for blocking the communication opening 6 between the two chambers 4 and 4'.

The valve device 1 thus comprises a first regulating means (sliding drawer 2) controlled by an actuator 10 for simultaneously monitoring two fluid outlets 8 and 8'. It also comprises a second independently-controlled regulating means (block device 7) whose state may depend directly on a control parameter, for example the temperature of the fluid that circulates in the first chamber 4.

In addition, the sliding drawer 2 forms a dual regulating element, monitoring the circulation of fluid at two inside openings of the valve body 3 and thereby between three inside volumes of the latter (first chamber 4 and first and second regions 9 and 9' of the second chamber 4'), with each of these volumes being equipped with at least one opening toward the outside.

The presence of two blocking elements 12 and 12' makes it possible, during the movement of the drawer 2, to produce a predetermined sequence for release and closing of the outlet openings 8 and 8', optionally gradual in part, based on the shape and the arrangement of the blocking elements 12 and 12' and openings 6 and 11. A so-called "three-way" valve device 1 is thus obtained.

In addition, the selective blocking of the inside openings 6 and 11 of the valve body 3 in opposite end positions of the sliding drawer 2, by flattening the first blocking element 12 on said openings in the direction of the sliding of the drawer 2, makes it possible to achieve a closing quality of said openings that is greater than the one resulting from blocking by a lateral translational movement (such as the one resulting in particular from the two above-mentioned FR documents).

In particular, the crushing or the compression of a corresponding joint 14 or 14' in positions for blocking openings 6 and 11 makes it possible to achieve a seal of very good quality and with small residual leaks (for example on the order of 1 liter/hour, and even less).

Consistent with a preferred structural variant embodiment of the valve device 1, the second lateral fluid-outlet opening 5' of the first chamber 4, the communication opening 6 between the first and second chambers 4 and 4', and the opening or the inside communication passage 11 between the two volumetric regions 9 and 9' of the second chamber 4' are arranged in an aligned manner in the axial direction X that corresponds to the axis of translation of the drawer 2, with the shaft or the control rod 10' connecting the latter to the actuator 10, rotary or translative, also being arranged along this X axis and extending into the valve body 3, with production of a radial seal, through an opening 13 that emerges into the second volumetric region 9' of the second chamber 4'.

So as to achieve simple manufacturing and a sturdy structure, the sliding drawer 2 is an integral piece that integrates the first and second blocking elements 12 and 12' and is guided into the first and second chambers 4 and 4'.

In addition, and in an advantageous manner, the blocking element 7 that is combined with—and that monitors—the second fluid-outlet opening 5' of the first chamber 4 is a thermostatic blocking element, whose heat-sensitive component is located in said chamber 4.

The thermostatic blocking device 7 can, for example, comprise a valve 22 that can, for example by cooperation of shape and compression of a joint, ensure a seal of very good quality in a blocked or closed position (for example with leaks that are smaller than or equal to 1 liter/hour). This valve 22 is stressed elastically in the closed position of the outlet opening 5' by a spring 22' or the like resting in the valve body 3 and forced to open by the heat-sensitive element of the physical or chemical actuator type that reacts to temperature, for example a wax cartridge that is housed in a body 7' that is bathed by the fluid, where this is done by means of a maneuvering shaft 22".

Such a blocking device 7 can thus constitute a positive safety element, in addition to its function of regulating flow based on temperature.

As the figures of the accompanying drawings show and according to an advantageous practical embodiment of the invention, the first blocking element 12 has a plate structure and can selectively rest under pressure on the edges of the communication opening 6 between the two chambers 4 and 4' and the inside communication opening 11 between the two regions 9 and 9' of the second chamber 4', with the airtight blocking of these openings 6 and 11 being achieved by compression of a corresponding joint 14, 14', these joints 14, 14' being mounted or formed by casting at opposite surfaces of said first element 12 or around above-mentioned openings 6, 11.

To allow the passage of the fluid when it is not in blocking position, while being guided into the first region 9 of the second chamber 4', the first blocking element 12 can have lateral feet in contact with the inside wall of the chamber or comprise cut-outs (in particular when the guiding is carried out over the entire periphery of the element).

In accordance with another characteristic of the invention, the second blocking element 12' slides into the second region 9' of the second chamber 4' by being guided and by producing a peripheral radial seal, at least partial or limited, between the outside peripheral edge of said second element 12' and the inside surface 15 of the wall of the valve body 3 bordering said second region 9', and the second lateral fluid-outlet opening 8' emerges into said second region 9' in an axially offset position relative to the inside fluid communication opening 11 in such a way as to make it possible to define a range of translational movement positions of the second blocking element 12' in the second region 9' in which it prevents fluid communication between the first region 9 of the second chamber 4' and the second lateral outlet opening 8'.

This second blocking element 12' can, for example, take the shape of a cylindrical sleeve, whose outside surface works by sliding contact with the inside surface 15, by thus carrying out the guiding and sealing functions.

In a preferred manner, the inside surface 15 consists of the inside surface, optionally reworked or coated with a suitable material, of the wall of the part 3" that forms the second chamber 4' of the valve body 3, with the second blocking element 12' being equipped on its outside peripheral edge with a scraper segment or the like in sliding contact with said inside surface 15, in such a way as to achieve an at least partial or limited seal at this level.

As a variant, this inside surface 15 can also be formed by a preferably metal sleeve, forming a jacket, equipped with at least one gap or cut-out 15' that is positioned opposite the second lateral outlet opening 8' and that integrates, if necessary, at its opening that defines the inside communication opening 11, an annular flange 15" that is optionally equipped with a circumferential groove for receiving a compression joint 14', for example an O-ring, with the second blocking element 12' being guided into said jacket 15 with reduced play (see, for example, FIGS. 2, 3A, 4 and 5).

For the purpose of making it possible for the valve device 1 to implement an additional function for monitoring the circulation of the fluid, affecting the distribution of the latter between the three outlets, it may be provided that the sliding drawer 2 comprises a third blocking element 16, 17 that is located in the first chamber 4 and offset axially relative to the first and second blocking elements 12 and 12' in such a way that it occupies an at least partial blocking position of the communication opening 6 between the first and second chambers 4 and 4' when the first blocking element 12 closes the inside communication opening 11 between the two volumetric regions 9 and 9' of the second chamber 4', with said third blocking element 16, 17 optionally working with the thermostatic blocking device 7 for purposes of guiding and/or blocking the opening 6.

It thus is possible to limit the flow of fluid passing from the first chamber 4 into the second chamber 4' when the inside communication opening 11 is closed by the first blocking element.

The flow through the first outlet opening 5 is then maximized by being regulated by the thermostatic blocking element 7 that integrates a direct heat regulation.

Consistent with a practical implementation of the above-mentioned additional blocking means, the thermostatic blocking device 7 that is mounted in the first chamber 4 comprises a cylindrical body 7' that extends into said first chamber 4 in the direction of the communication opening 6 between the first and second chambers 4, 4', while being aligned with the axis of translation X, and the sliding drawer 2 comprises a projecting formation 16 that extends, in a non-blocking manner, through the above-mentioned communication opening 6 and that has an end 17 with an essentially annular structure, able to slide around and along the cylindrical body 7', at least over a portion of its sliding path, and positioned, in a position for blocking the inside fluid communication opening 11 by the sliding drawer 2, at or in the fluid communication opening 6 between the first and second chambers 4, 4' by thus implementing an at least partial blocking of the latter.

This possibility of interference and cooperation between the body 7' of the blocking device 7 and the projecting formation 16 makes it possible to reduce the size of the first chamber 4 in the direction X and therefore the space requirement of the valve body 3.

According to a first variant embodiment, the projecting formation 16 advantageously consists of at least two, preferably four, feet 16' that are parallel and spaced, connected or formed on the sliding drawer 2, preferably integral with the first blocking element 12 of the latter, and the cylindrical body 7' of the thermostatic blocking device 7, or a connected cylindrical sleeve 18 that surrounds and/or extends the latter, extends up to the communication opening 6 between the two chambers 4, 4' in such a way that a block that is essentially complete, airtight, or with a calibrated leak is obtained when the annular end 17 of the projecting formation 16 is positioned at or in said communication opening 6 (not shown).

Figure 1:
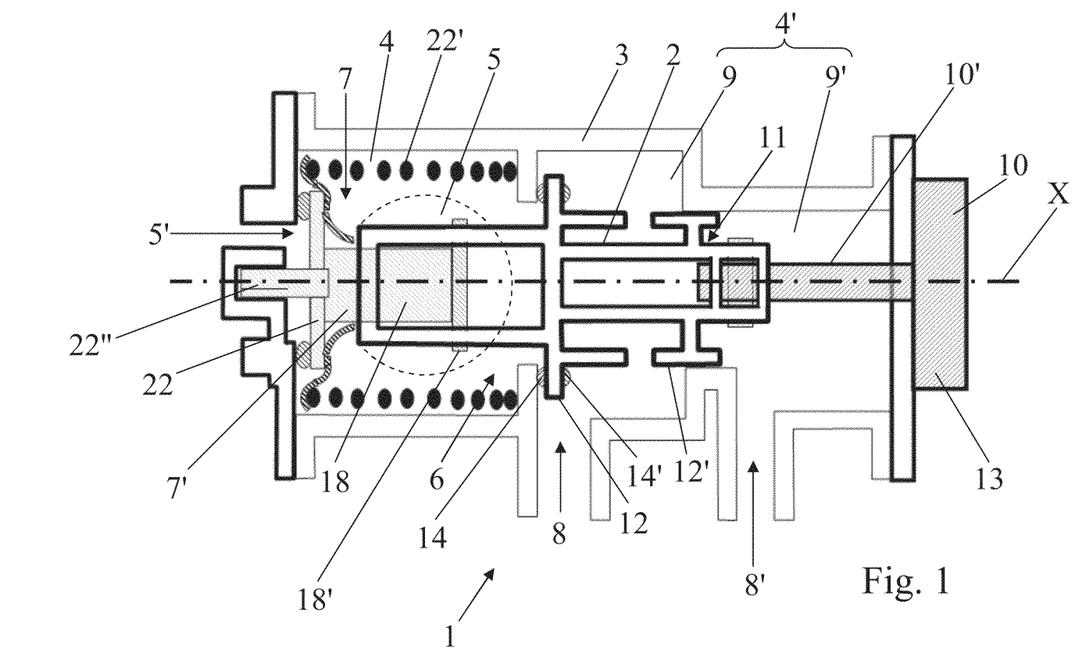
FIG. 1 is a simplified cutaway view diagrammatically showing the primary components that constitute a valve device according to the invention.
Figure 2:
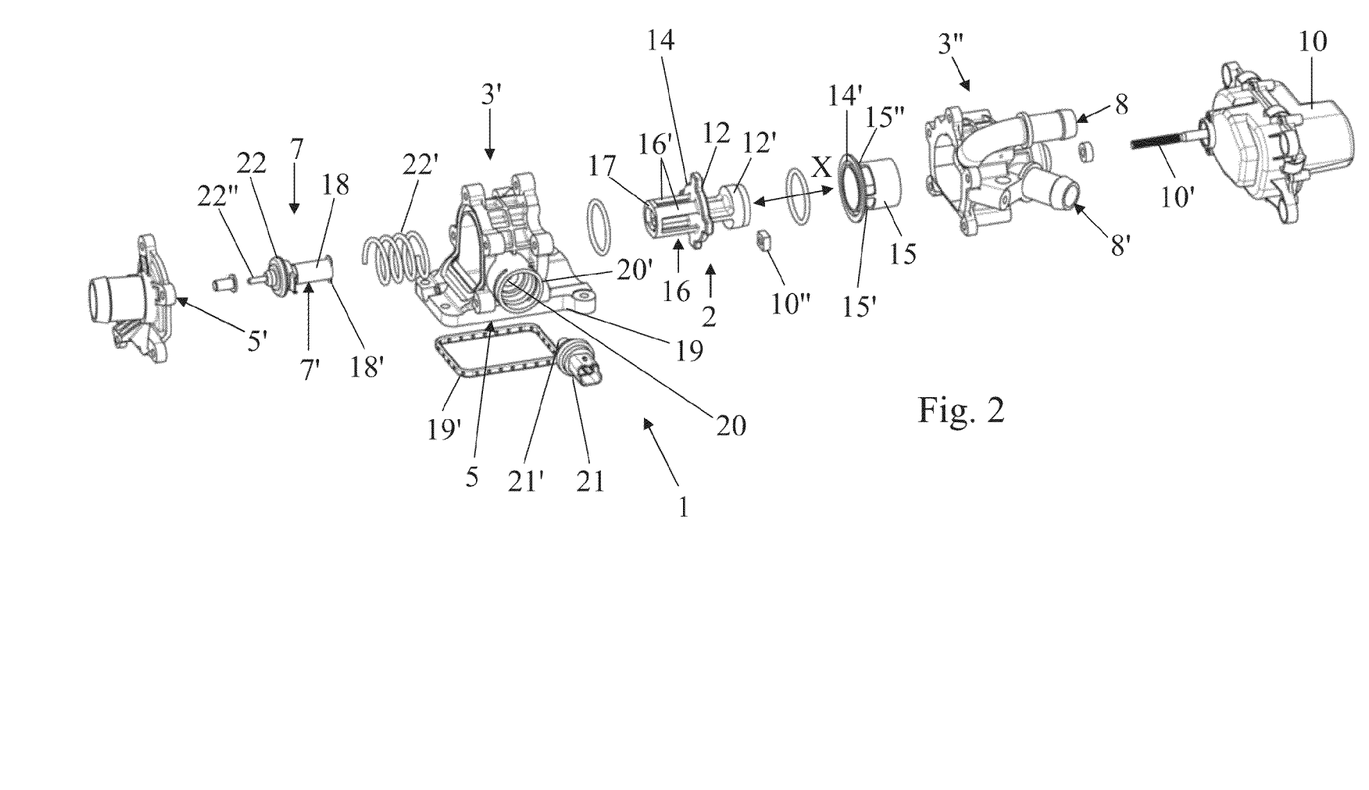
FIG. 2 is an exploded perspective view of a valve device according to a first practical embodiment of the invention.
Figure 4:
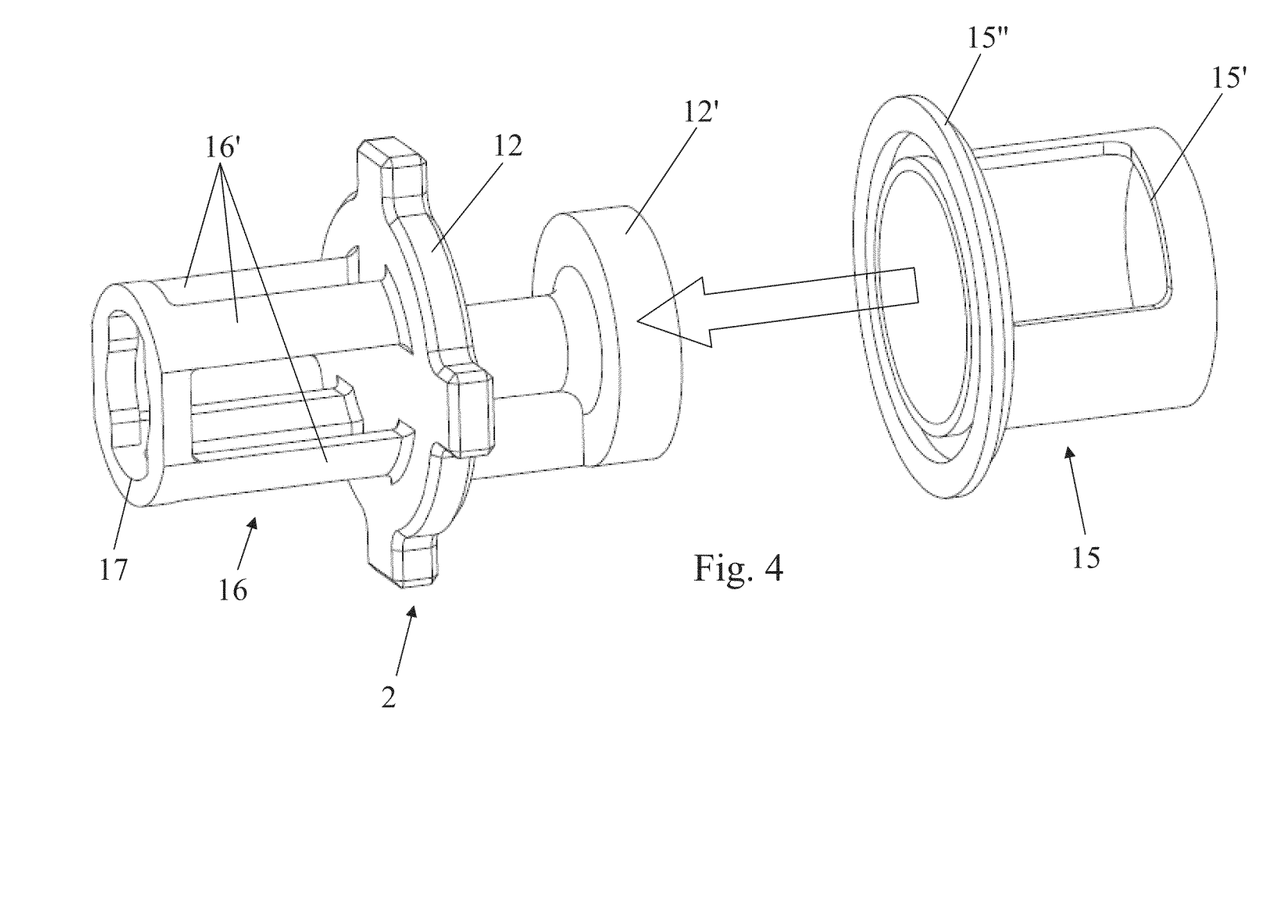
FIG. 4 is a perspective view of two parts (drawer and jacket) that is part of the valve device shown in FIGS. 2 and 3.
Figure 5:
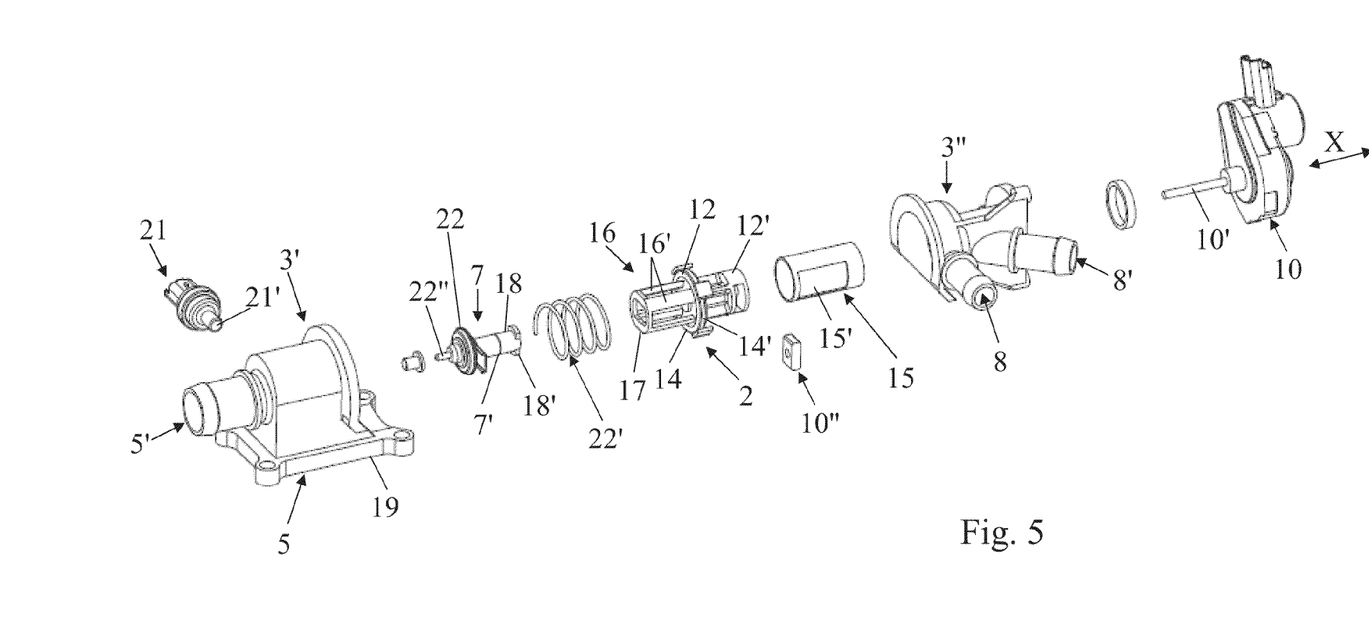
FIG. 5 is an exploded perspective view of a valve device according to a second practical embodiment of the invention.

Consistent with a second variant embodiment and as FIGS. 2, 4 and 5 show, the projecting formation 16 consists of at least two, preferably four, feet 16' that are parallel and spaced, connected or formed on the sliding drawer 2, preferably integral with the first blocking element 12 of the latter, with the cylindrical body 7' of the thermostatic blocking device 7 being equipped with a telescopic cylindrical sleeve 18 whose end can become engaged, for example by means of two radial feet 18', with the annular structure 17 for the purpose of its deployment, preferably under elastic stress, in the direction of the communication opening 6 between the first and second chambers 4 and 4', whereby this opening 6 is essentially blocked, in an airtight manner, or with a calibrated leak, when said annular structure 17 is positioned at or in said opening 6.

Preferably, the first and second volumetric regions 9 and 9' of the second chamber 4' have circular cylindrical shapes, with symmetry around the axial direction X. However, other cross-sectional shapes can also be considered.

So as to facilitate the connection of the pipes that form the circuit portions for outside circulation, the three fluid-outlet openings 5', 8 and 8' of the valve body 3 are extended on the outside by respective connection end fittings, formed integrally with said valve body 3.

For the purpose of allowing an airtight and resistant attachment of the valve device 1 to an engine block, the first intake opening 5 of the first chamber 4 is surrounded, on the outside surface of the valve body 3, with an attachment plate 19 that integrates a connected or cast-on sealing joint 19'.

So as to be able to provide a precise measuring signal of the temperature of the fluid for purposes of display, control and/or monitoring, the first chamber 4 comprises an additional lateral opening 20 that is extended on the outside by an airtight receiving site 20' of a temperature sensor 21, whose sensitive end 21' projects into said chamber 4 after said sensor 21 is mounted.

To be able to provide a structural and functional unit that integrates all of the means that are necessary for the implementation of various functions of the valve device 1, while preserving a simple and compact composition, the actuator 10 is assembled rigidly with the valve body 3 and consists of a rotary actuator, optionally combined with a position sensor, and comprising a control axis 10' in the form of a threaded rod that works with a screw 10" that is mounted in a blocked manner in rotation in the sliding drawer 2, making it possible to monitor in a precise manner the operation and the movement of the drawer 2.

In accordance with an advantageous practical design variant and as shown in FIGS. 1 to 3 and 5, the valve body 3 is formed by at least two component parts 3', 3" made of thermoplastic or Thermodur material, obtained from molding and assembled in an airtight manner by welding (by vibration or by laser, for example), by screwing or bonding at an assembly plane, with a first part 3' that defines for the most part the first chamber 4 and a second part 3" that defines the second chamber 4'.

FIG. 2 illustrates a design variant of the valve body 3 consisting of three parts, whereas FIG. 5 illustrates a design variant consisting of only two parts.

The compression joints 14 and 14' are advantageously O-ring joints that are always mounted by bonding in corresponding grooves that surround the openings 6 and 11 and are made of modified rubber (for example of the EPDM type or silicone).

FIGS. 3A to 3D illustrate different configurations of the valve device 3 corresponding to successive and sequential regulation phases, depending on the translational position of the drawer 2 and the temperature of the fluid that circulates through the valve.

Figure 3:
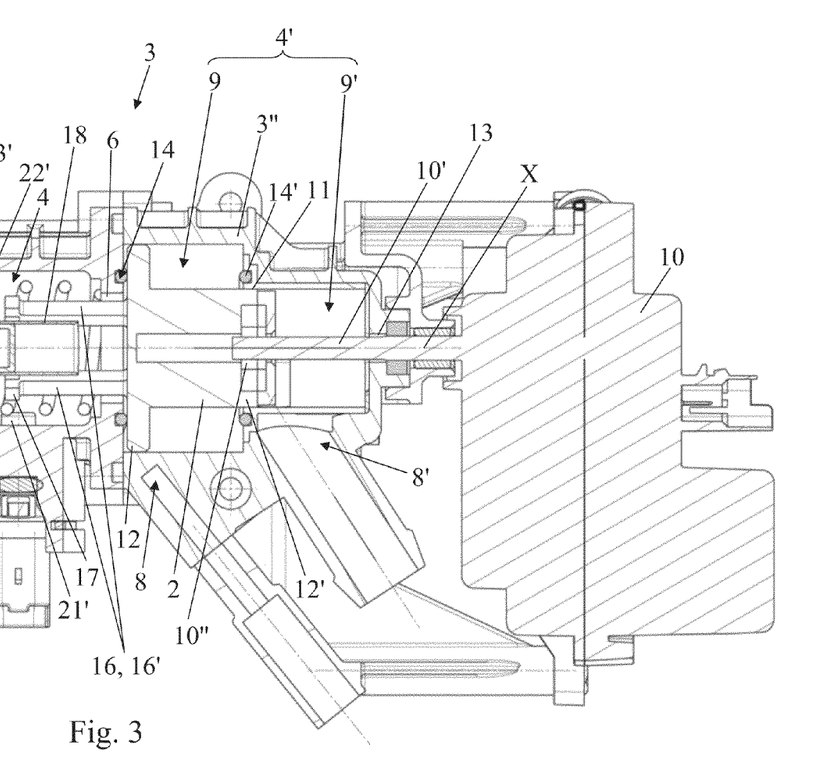
FIGS. 3A to 3D are cutaway views of a valve device as shown in FIG. 2, in the assembled state, illustrating four positions of the sliding drawer corresponding to four different states of said valve device.
Figures 3, 3B:
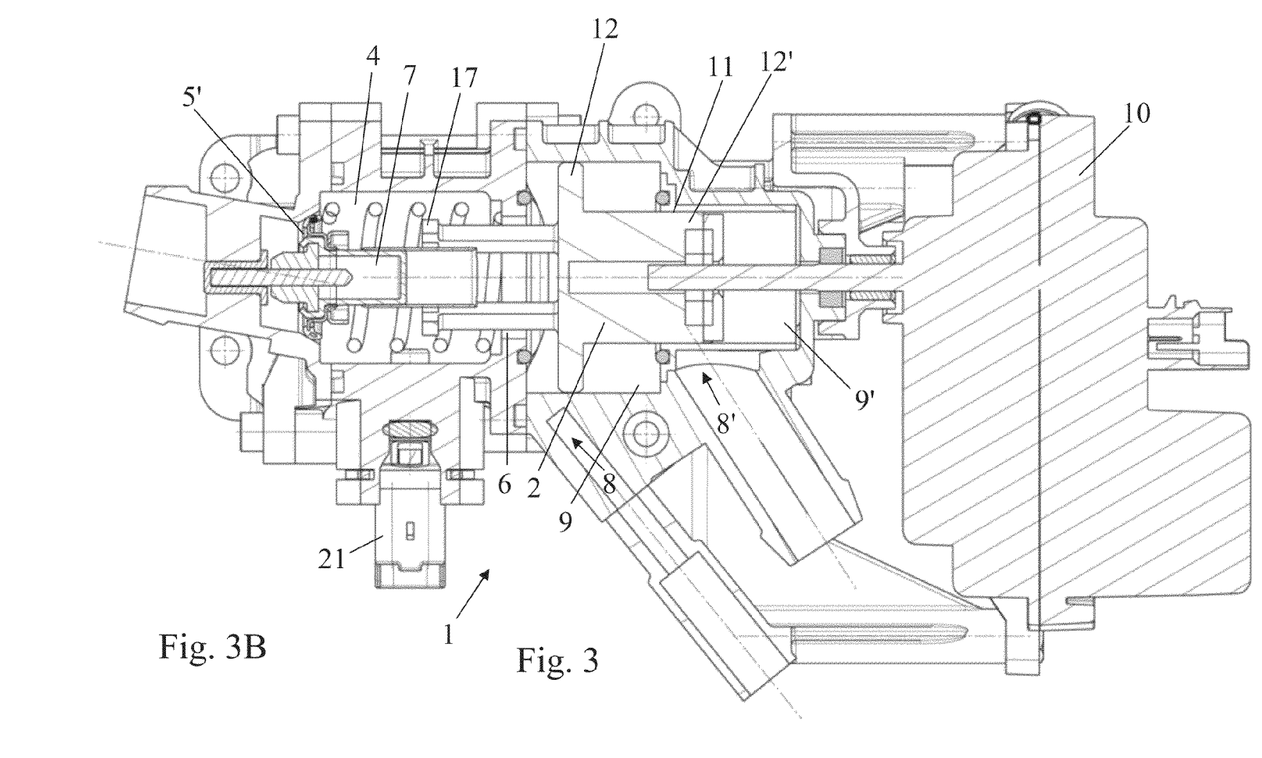
Figures 3, 3C:
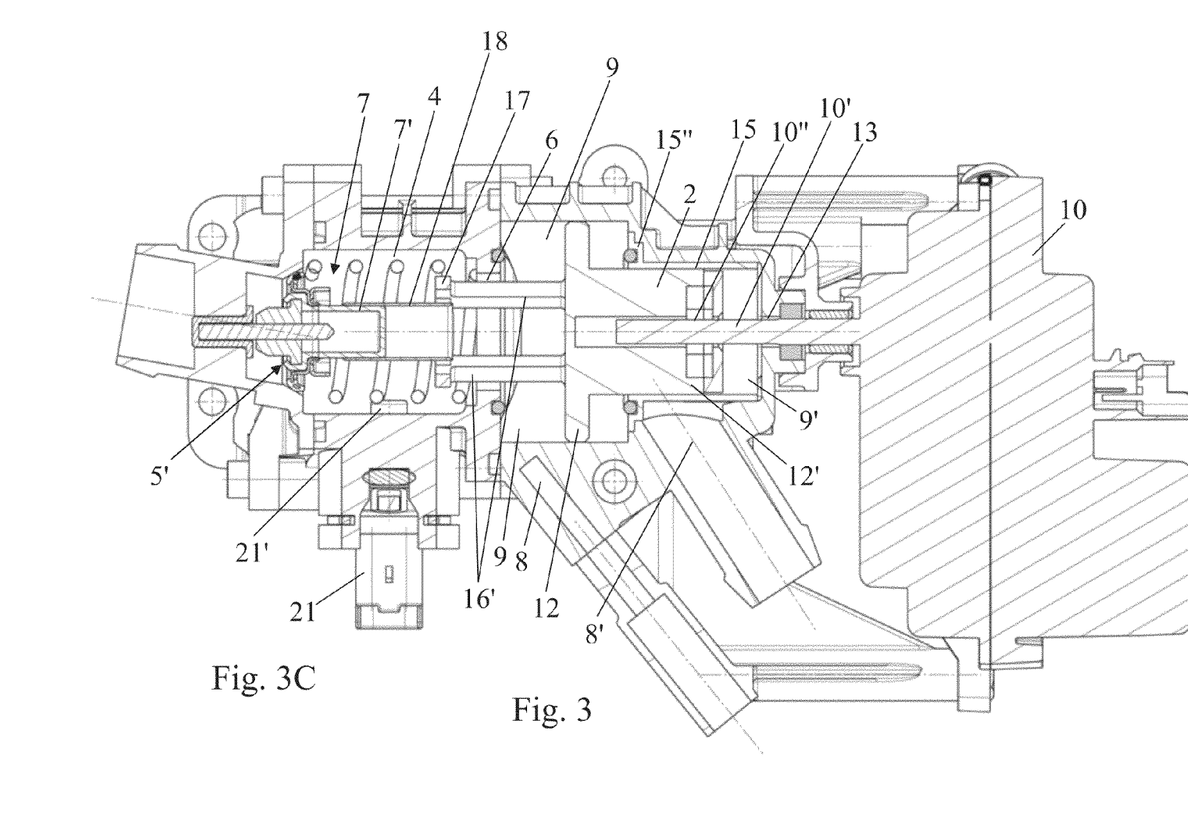
Figures 3, 3D:
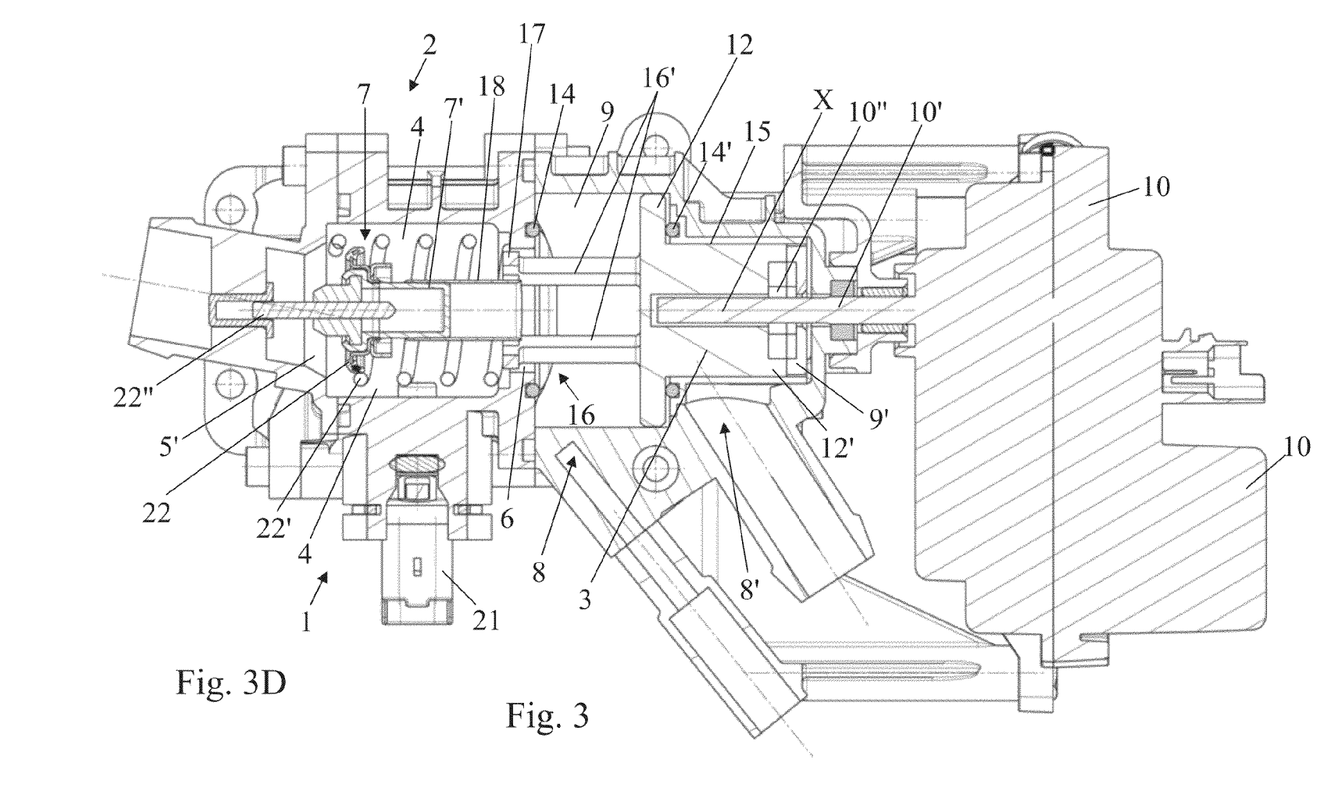
Figure 3A:
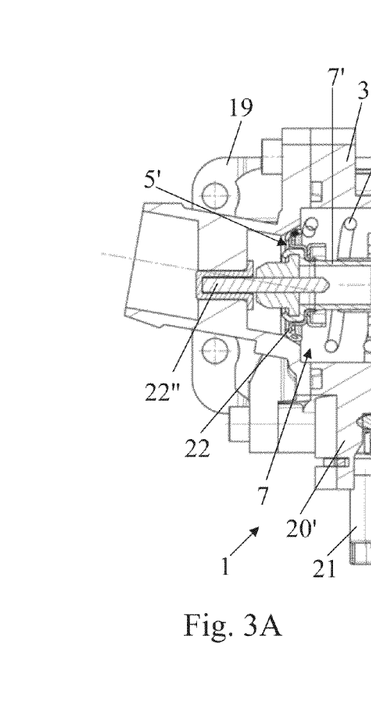

In FIG. 3A, no fluid circulates through the valve device 1, all of the outlet openings 5', 8 and 8' being blocked directly (cold fluid, whose opening 5 is blocked) or indirectly (by the blocking of the communication opening 6).

In FIG. 3B, the communication opening 6 is released because of the movement of the blocking element 12, and the fluid can therefore flow through the outlet opening 8, with the outlet opening 8' not being supplied with fluid because of the position of the blocking element 12' in the second region 9' (to be seen relative to FIGS. 2 and 4).

In FIG. 3C, an additional movement of the drawer 2 (relative to its position in FIG. 3B) brought the second blocking element 12' into a position that makes it possible to release the second outlet opening 8' at least partially and therefore allows the passage of fluid at this level, with the outlet opening 8 furthermore remaining released.

In FIG. 3D, the drawer 2 is moved into its opposite end position (relative to that of FIG. 3A) and the first element 12 blocks—in an airtight manner—the inside opening 11 that prevents the intake of fluid into the second region 9' and into the outlet opening 8'.

Simultaneously, the third sealing means 17 of the drawer 2, as well as the end of the cylindrical sleeve 18, have been brought to the level of or into the communication opening 6 that is thus essentially closed, or very greatly limited in terms of fluid passage toward the second chamber 4'.

FIG. 3D also illustrates the release of the outlet opening 5' of the first chamber 4 when the temperature of the fluid exceeds a defined threshold value.

The different regulation phases illustrated in FIGS. 3A to 3D can, for example, correspond to different configurations that are desired for a cooling circuit of an internal combustion engine, based on its operating phases (cold start-up, intermediate operating phase with a rise in temperature, and a common operating phase).

The invention also has as its object a fluid circulation circuit for cooling an internal combustion engine of a motor vehicle, characterized in that it comprises a valve device 1 as described above, in which the first fluid-intake opening 5 of the first chamber 4 is connected to the water outlet of the block-cylinder head of said engine; the second fluid-outlet opening 5' of the first chamber 4 is connected to the circuit that supplies the radiator of the vehicle; the first lateral fluid-outlet opening 8 of the second chamber 4' is connected to a first cooling circuit, for example a circuit that supplies the heater of the vehicle; and the second lateral fluid-outlet opening 8' of the second chamber 4' is connected to a second cooling circuit or bypass circuit, optionally supplying at least one heat exchanger.

Of course, the invention is not limited to the embodiments that are described and shown in the accompanying drawings. Modifications are possible, in particular from the standpoint of the composition of the various elements or by substitution of equivalent techniques, without thereby exceeding the scope of protection of the invention.

The invention claimed is:

1. A sliding-drawer slide valve device operating in a given axial direction, comprising:
   a sliding drawer, and
   a valve body with first and second chambers that communicate with one another and are contiguous in an axial direction of the device,
   the first chamber comprising a first lateral fluid-intake opening and a second fluid-outlet opening located essentially opposite a communication opening (6) with the second chamber, the first chamber equipped with a blocking device that closes and opens conditionally,
   the second chamber comprising first and second lateral fluid-outlet openings that are mutually offset in the axial direction, and that emerge respectively into first and second regions or inside volumetric zones that are separate from said second chamber,
   the sliding drawer being guided in translation in said second chamber and movable under the action of a monitored-control actuator,
   the first and second inside regions (9 and 9') of said second chamber (4') arranged in a contiguous manner in the axial direction (X) and communicate with one another by an opening or inside communication passage (11),
   the sliding drawer (2) comprising:
   a first blocking element (12) that can selectively block, in two opposite end sliding positions of the sliding drawer (2) and by compression of a respective corresponding joint (14, 14'), the communication opening (6) between the first and second chambers (4 and 4') or the opening or inside communication passage (11) between the first and second inside regions (9 and 9') of the second chamber (4'), and
   a second blocking element (12') that can prevent fluid communication between the second lateral fluid-outlet opening (8') of the second chamber (4') and the first inside region (9) of said second chamber (4'), in a defined range of translational movement of the sliding drawer (2) from its end position for blocking the communication opening (6) between the two first and second chambers (4 and 4').

2. The valve device according to claim 1, wherein the second lateral fluid-outlet opening (5') of the first chamber (4), the communication opening (6) between the first and second chambers (4 and 4'), and the opening or inside communication passage (11) between the first and second volumetric regions (9 and 9') of the second chamber (4') are arranged in an aligned manner in the axial direction (X) that corresponds to the axis of translation of the sliding drawer (2),
   further comprising a shaft or control rod (10') connecting the sliding drawer to a rotary or translative actuator (10) also being arranged along said axis and extending into the valve body (3), with a radial seal, through an opening (13) that emerges into the second volumetric region (9') of the second chamber (4').

3. The valve device according to claim 1, wherein the first intake opening (5) of the first chamber (4) is surrounded, on an outside surface of the valve body (3), by an attachment plate (19) that integrates a connected or cast-on sealing joint (19'), and
   wherein the first chamber (4) further comprises an additional lateral opening (20) that is extended on the outside of the valve body by a site (20') for airtight receiving of a temperature sensor (21), a sensitive end (21') of the sensor projecting into said chamber (4) after said sensor (21) is mounted.

4. The valve device according to claim 1, wherein the control actuator (10) is assembled rigidly with the valve body (3), and comprises a rotary actuator, optionally combined with a position sensor, and comprising a control axis (10') in the form of a threaded rod that works with a screw (10") that is mounted in a locked manner in rotation in the sliding drawer (2).

5. The valve device according to claim 1, wherein the valve body (3) is formed by at least two component parts (3', 3")

made of thermoplastic or Thermodur material, obtained from molding and assembled in an airtight manner by welding, screwing or bonding at an assembly level, a first part (3') defining the first chamber (4) and a second part (3") defining the second chamber (4').

6. A fluid circulation circuit for cooling an internal combustion engine of a motor vehicle, comprising the valve device (1) according to claim 1,
wherein the first fluid-intake opening (5) of the first chamber (4) is connected to a water outlet of a block-cylinder head of said engine;
the second fluid-outlet opening (5') of the first chamber (4) is connected to a circuit that supplies a radiator of the vehicle;
the first lateral fluid-outlet opening (8) of the second chamber (4') is connected to a first cooling circuit that supplies a heater of the vehicle; and
the second lateral fluid-outlet opening (8') of the second chamber (4') is connected to a second cooling circuit or bypass circuit, optionally supplying at least one heat exchanger.

7. The valve device according to claim 2, wherein the sliding drawer (2) is an integral part, integrating the first and second blocking elements (12 and 12') and guided into the first and second chambers (4 and 4'), and
further comprising a blocking element (7) that is combined with and that monitors the second fluid outlet opening (5') of the first chamber (4), the blocking element being a thermostatic blocking element having a heat-sensitive component that is located in said first chamber (4).

8. The valve device according to claim 1,
wherein the sliding drawer (2) is an integral part, integrating the first and second blocking elements (12 and 12') and guided into the first and second chambers (4 and 4'), and
further comprising a blocking element (7) that is combined with and that monitors the second fluid-outlet opening (5') of the first chamber (4), the blocking element being a thermostatic blocking element, whose heat-sensitive component is located in said chamber (4).

9. The valve device according to claim 1,
wherein the first blocking element (12) has a plate structure and can selectively rest under pressure on edges of the communication opening (6) between the first and second chambers (4 and 4') and the inside communication opening (11) between the first and second regions (9 and 9') of the second chamber (4'),
with an airtight blocking of the communication opening (6) and the inside communication opening (11) being achieved by compression of a corresponding joint (14, 14'),
said joints (14, 14') being mounted or formed by casting at opposite surfaces of said first element (12) or around the communication opening (6) and inside communication opening (11).

10. The valve device according to claim 1,
wherein the second blocking element (12') slides into the second region (9') of the second chamber (4') by being guided and by producing a peripheral radial seal, at least partial or limited, between an outside peripheral edge of said second element (12') and an inside surface (15) of a wall of the valve body (3) that borders said second region (9'), and
wherein the second lateral fluid-outlet opening (8') of the second chamber emerges into said second region (9') in an axially offset position relative to the inside communication opening (11) in such a way as to make it possible to define a range of positions of translational movement of the second blocking element (12') in the second region (9'), wherein the second blocking element prevents fluid communication between the first region (9) of the second chamber (4') and the second lateral outlet opening (8') of the second chamber.

11. The valve device according to claim 10,
wherein an inside surface (15) of the device is optionally reworked or coated with a suitable material, the inside surface comprising a wall of a part (3") that forms the second chamber (4') of the valve body (3), and
the second blocking element (12') being equipped on its outside peripheral edge with a scraper segment in sliding contact with said inside surface (15).

12. The valve device according to claim 10,
wherein an inside surface (15) of a wall that borders the second region (9') of the second chamber (4') is formed by a metal sleeve that forms a jacket, having at least one gap or cut-out (15') that is positioned opposite the second lateral outlet opening (8') of the second chamber, and that integrates at an opening that defines the inside communication opening (11), an annular flange (15") that is optionally equipped with a circumferential groove for receiving a compression joint (14'), with the second blocking element (12') being guided into said jacket (15) with reduced play.

13. The valve device according to claim 1,
wherein the sliding drawer (2) comprises a third blocking element (16, 17) that is located in the first chamber (4) and is offset axially relative to the first and second blocking elements (12 and 12') in such a way that it occupies an at least partial blocking position of the communication opening (6) between the first and second chambers (4 and 4') when the first blocking element (12) closes the inside communication opening (11) between the two volumetric regions (9 and 9') of the second chamber (4'),
said third blocking element (16, 17) optionally working with a thermostatic blocking device (7) for guiding and/or blocking the opening (6).

14. The valve device according to claim 1, further comprising a thermostatic blocking device (7) that is mounted in the first chamber (4), wherein the thermostatic blocking device comprises a cylindrical body (7') that extends into said first chamber (4) in the direction of the communication opening (6) between the first and second chambers (4, 4'), while being aligned with the axis of translation, and
wherein the sliding drawer (2) comprises a projecting formation (16) that extends in a non-blocking manner through the communication opening (6) and that has an end (17) with an essentially annular structure, able to slide around and along the cylindrical body (7'), at least over a portion of its sliding path, and positioned in a position for blocking the inside communication opening (11) by the sliding drawer (2), at or in the communication opening (6) between the first and second chambers (4, 4') by thus implementing an at least partial blocking of the second chamber.

15. The valve device according to claim 14,
wherein the projecting formation (16) comprises at least two feet (16') that are parallel and spaced, connected or formed on the sliding drawer (2), and
wherein the cylindrical body (7') of the thermostatic blocking device (7), or a connected cylindrical sleeve (18) that surrounds and/or extends the thermostatic blocking device, extends up to the communication opening (6) between the two chambers (4, 4') in such a way that a block that is essentially complete, airtight, or with a calibrated leak is obtained when an annular end (17) of the projecting formation (16) is positioned at or in said communication opening (6).

16. The valve device according to claim 14, wherein the projecting formation (16) comprises at least two feet (16') that are parallel and spaced, connected or formed on the sliding drawer (2), with the cylindrical body (7') of the thermostatic blocking device (7) being equipped with a telescopic cylindrical sleeve (18) that can engage with an annular structure (17) for the purpose of its deployment, in the direction of the communication opening (6) between the first and second chambers (4 and 4'), whereby said communication opening (6) is essentially blocked, in an airtight manner, or with a tolerated or calibrated leak, when said annular structure (17) is positioned at or in said opening (6).

17. The valve device according to claim 1, wherein the first and second volumetric regions (9 and 9') of the second chamber (4') have circular cylindrical shapes with symmetry around the axial direction (X).

18. The valve device according to claim 1, wherein the second fluid-outlet opening of the first chamber and the first and second fluid-outlet openings of the second chamber (5', 8 and 8') of the valve body (3) are extended outside the valve body by respective connection end fittings, formed integrally with said valve body (3).

* * * * *